(12) United States Patent
Hatch

(10) Patent No.: US 11,310,283 B1
(45) Date of Patent: Apr. 19, 2022

(54) SCANNING AND REMEDIATING CONFIGURATION SETTINGS OF A DEVICE USING A POLICY-DRIVEN APPROACH

(71) Applicant: Salt Stack, Inc., Lehi, UT (US)

(72) Inventor: Thomas S. Hatch, Lehi, UT (US)

(73) Assignee: VMWARE, INC., Palo Alto, CA (US)

( * ) Notice: Subject to any disclaimer, the term of this patent is extended or adjusted under 35 U.S.C. 154(b) by 233 days.

(21) Appl. No.: 16/125,543

(22) Filed: Sep. 7, 2018

(51) Int. Cl.
  *H04L 29/06* (2006.01)
  *H04L 12/24* (2006.01)
  *H04L 41/0816* (2022.01)
  *H04L 41/0866* (2022.01)

(52) U.S. Cl.
  CPC ........ *H04L 63/205* (2013.01); *H04L 41/0816* (2013.01); *H04L 41/0866* (2013.01)

(58) Field of Classification Search
  CPC .......................... H04L 63/205; H04L 41/0816
  See application file for complete search history.

(56) References Cited

U.S. PATENT DOCUMENTS

| | | | | |
|---|---|---|---|---|
| 2002/0095572 A1* | 7/2002 | Frank | .................... | G06F 21/604 713/166 |
| 2002/0095592 A1* | 7/2002 | Daniell | ................. | G06F 21/604 726/26 |
| 2002/0116630 A1* | 8/2002 | Stehlin | .................. | G06F 21/577 726/3 |
| 2003/0065942 A1* | 4/2003 | Lineman | ............... | H04L 63/102 726/4 |
| 2006/0179476 A1* | 8/2006 | Challener | ............... | H04L 63/20 726/4 |
| 2006/0184490 A1* | 8/2006 | Heim | ................... | H04L 41/0873 706/46 |
| 2007/0094284 A1* | 4/2007 | Bradford | ................ | G06Q 10/06 |
| 2008/0222631 A1* | 9/2008 | Bhatia | ................. | G06F 11/3604 717/178 |
| 2008/0282320 A1* | 11/2008 | DeNovo | ............... | G06F 21/604 726/1 |
| 2010/0095348 A1* | 4/2010 | Foster | ................. | G06F 21/6236 726/1 |
| 2010/0333168 A1* | 12/2010 | Herrod | .................. | H04W 12/00 726/1 |
| 2011/0004914 A1* | 1/2011 | Ennis, Jr | ............. | H04L 41/0853 726/1 |
| 2014/0196108 A1* | 7/2014 | Barr | ...................... | H04L 63/205 726/1 |

(Continued)

*Primary Examiner* — Jason Chiang
(74) *Attorney, Agent, or Firm* — Hanley, Flight & Zimmerman, LLC

(57) ABSTRACT

The present disclosure relates to systems, methods, and computer-readable media for implementing an efficient and flexible policy-driven approach to securing a computing device. For example, systems disclosed herein can identify any number of security policies including configuration states associated with configuration settings of a client device. The systems disclosed herein can further enforce the security policies by performing an enforcement operation including an idempotent operation that enables a computing device to both diagnose as well as remedy security issues identified by an agent on a computing device. The systems disclosed herein further include features and functionality that enable a computing device to be compliant with multiple security standards without performing redundant enforcement operations.

15 Claims, 9 Drawing Sheets

(56) References Cited

U.S. PATENT DOCUMENTS

| | | | |
|---|---|---|---|
| 2015/0269383 A1* | 9/2015 | Lang ........................ | H04L 63/20 |
| | | | 726/1 |
| 2016/0219077 A1* | 7/2016 | Pandya .................... | H04L 63/20 |
| 2018/0234463 A1* | 8/2018 | Briski ...................... | H04L 63/205 |
| 2018/0255102 A1* | 9/2018 | Ward ........................ | H04L 63/10 |
| 2019/0394238 A1* | 12/2019 | Putz ......................... | G06N 20/20 |
| 2020/0193058 A1* | 6/2020 | Vaidhyanathan ... | G06F 16/1734 |

\* cited by examiner

US 11,310,283 B1

SCANNING AND REMEDIATING CONFIGURATION SETTINGS OF A DEVICE USING A POLICY-DRIVEN APPROACH

BACKGROUND

Recent years have seen rapid development in software products and electronic devices. For example, software products can affect functionality related to communication of data to and from electronic devices as well as operation of operating systems and/or individual applications installed on the electronic devices. As software and hardware become more complex, it becomes increasingly difficult to effectively secure information contained on electronic devices as well as information transmitted to and from electronic devices (e.g., over the Internet). Indeed, in an attempt to gather information, many individuals use viruses, spyware, malware, and other threatening tools to gather sensitive and/or valuable information.

While many tools exist for avoiding potential threats in cybersecurity of electronic devices, conventional cybersecurity systems often fail to adequately address potential security issues. For example, conventional cybersecurity systems typically utilize dedicated diagnostic tools for identifying whether a personal computer is compliant with a known security standard. Conventional diagnostic tools, however, are limited to providing a report of settings or configurations on a device that are out of compliance with a known set of standards. The report is then generally provided to an information technology (IT) administrator who manually addresses issues identified by the report or, alternatively, utilizes a separate software tool to facilitate remediation of various issues identified by the diagnostic tool.

In addition to failing to enable effective diagnosis and remediation of potential security issues, conventional cybersecurity systems can be inflexible and computationally prohibitive. For example, conventional cybersecurity systems are often limited to scanning a device for compliance with a specific security standard (e.g., Center for Internet Security (CIS) standards, Standard Technical Implementation Guide (STIG) standards, Payment Card Industry (PCI) standards, and Health Insurance Portability and Accountability Act (HIPAA)). As a result, conventional systems may provide an effective tool for identifying potential security threats for a select group of devices or programs uniquely tailored to a particular security standard. However, conventional cybersecurity systems may fail to effectively identify potential security threats for other devices or programs not specifically tailored to the security standard. Furthermore, while a device may simply run different security checks based on multiple security standards, running comprehensive checks based on multiple standards can be expensive and can utilize significant computing resources.

These along with additional problems and issues exist with regard to conventional cybersecurity systems.

BRIEF SUMMARY

Embodiments of the present disclosure provide benefits and/or solve one or more of the foregoing and other problems in the art with systems, methods and computer-readable media that enforce security policies on a client device (or other computing device). In particular, in one or more embodiments, the disclosed systems enforce security policies by performing operations that enable an agent on the client device to both scan and fix security issues. For example, the disclosed systems can enforce a security policy by performing an idempotent operation in which a check and a fix of a security policy are the same operation (e.g., a check operation is the fix operation). In this way, the systems described herein can effectively identify and remediate configuration settings of a client device out of compliance with security standards using a single software agent.

In addition, in one or more embodiments the disclosed systems provide a policy-driven approach to enforcing security policies applicable to a wider range of client devices and applications. Indeed, by providing a policy-driven approach to enforcing security policies, the disclosed systems can enable a client device to comply with multiple security standards while performing a fewer number of operations than conventional systems, thereby improving performance of the client device without sacrificing substantial processing resources. In addition, by enforcing security policies using a policy-driven approach, the disclosed systems provide more effective security across a wider range of client devices and applications for which different security standards may be better suited to address potential security issues.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

The detailed description provides one or more embodiments with additional specificity and detail through the use of the accompanying drawings, as briefly described below.

DETAILED DESCRIPTION

Figure 1:
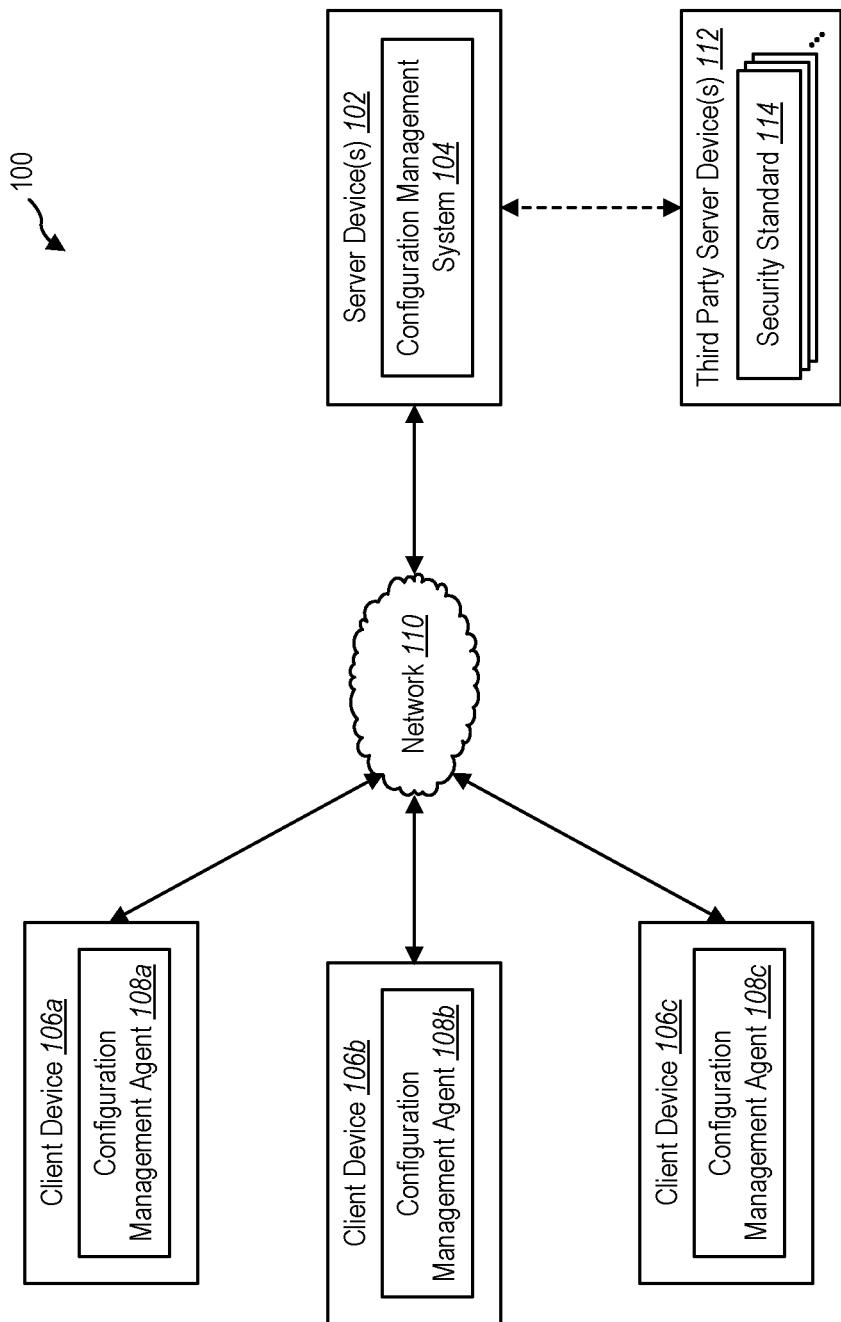
FIG. 1 illustrates an example environment in which a configuration management system and associated configuration management agents can operate in accordance with one or more embodiments.

One or more embodiments of the present disclosure include a configuration management system and configuration management agents that facilitate effective and flexible enforcement of security policies on a client device (or other computing device). For example, in one or more embodiments, a configuration management agent (or simply "agent") can identify a plurality of security policies including configuration states associated with configuration settings of the client device. Upon receiving a request to implement the security policies on the client device, the agent can perform operations to enforce the configuration states defined by the security policies. In particular, the agent can enforce the configuration states defined by the security policies by checking and fixing a configuration setting associated with the configuration state. Indeed, the agent can enforce security policies by performing idempotent operations in which a check and a fix of a configuration setting are the same operation (e.g., a check of the configuration setting is also the fix for the configuration setting).

In addition to generally enforcing configuration states defined by security policies, the configuration management system can additionally implement a policy-driven approach to enforcing security policies on a client device. Indeed, the configuration management system can enforce security policies that enable a client device to operate in accordance with a number of security standards. In one or more embodiments, the configuration management system maintains a plurality of security policies including configuration states associated with configuration settings on a client device in addition to mapping information associating the security policies with one or more security standards. In one or more embodiments, the configuration management system receives a request to enforce a first security standard. Based on the request, the configuration management system can identify a subset of security policies having mapping information associated with the first security standard and provide the subset of security policies to the client device for enforcement (e.g., by the agent on the client device). In one or more embodiments, enforcing the security standard involves performing an operation (e.g., an idempotent operation) of enforcing configuration states defined by the subset of security policies, thereby causing the client device to operate in accordance with the identified security standard.

As will be described in further detail below, the configuration management system and configuration management agent(s) provide a number of advantages over configuration cybersecurity systems. For example, by enforcing security policies using idempotent operations, the configuration management system can facilitate both diagnosing and remediating security issues using a single software package or agent implemented on a client device. Moreover, the configuration management system and/or agent on the client device can perform an operation (e.g., a single operation) of both identifying and remediating a security issue in response to a single user input. Accordingly, features and functionality described herein significantly reduce processing overhead as well as time spent by an administrative user in identifying and remediating security issues on a computing system.

In addition to more efficiently enforcing security policies, implementing a policy-driven approach to enforcing security policies provides significant flexibility over existing approaches to cybersecurity. For example, rather than implementing a wholesale and inflexible approach to security standards in accordance with a set security standard, the configuration management system can implement a policy-driven approach in which any number of policies can be selected and enforced on a client device including more or fewer security policies than those explicitly tied to a corresponding security standard.

Indeed, the configuration management system provides additional flexibility where many security standards include checks that uniquely apply to a specific type of client device or a common combination of applications running on a client device. For instance, rather than enforcing a fixed set of checks applicable to a specific security standard, the configuration management system can identify a set of policies more unique to a particular client device or set of applications running on the client device.

In addition, in contrast to conventional cybersecurity systems, the configuration management system can facilitate compliance with multiple standards without performing redundant operations on a computing system. For example, where a conventional security system would run a series of checks for each individual security standard, the configuration management system can maintain mapping information between security policies and security standards to use in determining a set of security policies that facilitate compliance across multiple security standards without performing redundant operations for security policies that different standards have in common. Indeed, by reducing a number of redundant operations as a result of repeatedly checking and fixing configuration settings multiple times (e.g., to comply with similar or identical requirements across different standards), the configuration management system can significantly reduce consumption of processing resources, which improves upon the functionality of a client device.

As illustrated by the foregoing discussion, the present disclosure utilizes a variety of terms to describe features and advantages of an environment including the configuration management system and configuration management agent(s). Additional detail is now provided regarding the meaning of many of these terms.

For instance, as used herein, a "configuration setting" refers to a setting of a device or application that affects operation of the device. In one or more embodiments described herein, a configuration setting refers to a changeable setting of an application, operating system, or functionality of a device. Examples of configuration settings include device or application permissions, functionality, user-access controls, or other setting that affects operation of a client device or network. Indeed, in some cases, a configuration setting can refer to whether an application is open or running, and how an application or operating system interfaces with a network. Further, a configuration setting can refer to a set of multiple functionalities that are added to or removed from an operating system or application in accordance with a state of the configuration setting. Moreover, in one or more embodiments described herein, a configuration setting specifically refers to a setting related to an intended functionality of a device or software rather than a bug or unintended functionality of the device or software. Thus, where a software patch or update is performed to repair one or more unintended functionalities of an application, this would not necessarily change a configuration setting in accordance with one or more embodiments described herein.

As used herein, a "security policy" refers to a data object including a defined state (e.g., a configuration state) of a configuration setting in compliance with one or more security standards. In one or more embodiments described herein, a security policy includes a defined configuration state and mapping information associating the defined configuration state with one or more applicable security standards. As used herein, a "configuration state" includes an indication of a configuration setting that would place a device or application in compliance with a corresponding security standard. Accordingly, in one or more embodiments described herein, a security policy includes a configuration state and associated mapping information where maintaining a configuration setting at the configuration state would place the configuration setting in compliance with one or more security standards as indicated by the mapping information included within the security policy.

As used herein, a "security standard" refers to tools, policies, concepts, safeguards, guidelines, actions, and other techniques or items related to protecting the cyber environment of a user or organization. In one or more embodiments, a security standard refers to a list of checks a device (e.g., a server device, client device) can perform to ensure that configuration settings on a device are in compliance with tools, policies, concepts, and other techniques defined by a particular security standard. In one or more embodiments described herein, a security standard includes policies including settings, checks, or other information associated with a specific security standard. By way of example and not by limitation, security standards may include published standards including Center for Internet Security (CIS) standards, Standard Technical Implementation Guide (STIG) standards, Payment Card Industry (PCI) standards, International Organization for Standards (ISO) 8000 standards, and Health Insurance Portability and Accountability Act (HIPAA) standards.

As mentioned above, and as will be described in further detail herein, a configuration management system and/or configuration management agents can perform an operation of enforcing a security policy on a computing device. As used herein, performing an operation of enforcing a security policy involves an action of setting, maintaining, or otherwise causing a configuration setting to comply with a configuration state defined by the security policy. In one or more embodiments described herein, performing an operation of enforcing a security policy involves performing an idempotent operation in which a check and a fix of a configuration setting refer to the same operation performed by a computing device. Accordingly, a client device can perform an idempotent operation of enforcing a security policy any number of times without changing a resulting configuration setting after the initial performance of the idempotent enforcement operation.

Additional detail will now be provided regarding an environment including the configuration management system and configuration management agents in relation to illustrative figures of example embodiments. For example, FIG. 1 illustrates an example environment 100 for implementing a policy-driven enforcement of security policies in accordance with one or more embodiments. As shown in FIG. 1, the environment 100 includes a server device(s) 102 including a configuration management system 104. The environment 100 further includes client devices 106a-c including configuration management agents 108a-c thereon. The environment 100 further includes a third-party server device(s) 112 including security standards 114.

As shown in FIG. 1, the server device(s) 102, client devices 106a-c, and third-party server device(s) 112 can communicate with each other directly or indirectly over a network 110. The network 110 may include one or multiple networks and may use one or more communication platforms or technologies suitable for transmitting data. In one or more embodiments, the network 110 includes the Internet or World Wide Web. In addition, or as an alternative, the network 110 can include other types of communication networks as described below (e.g., in relation to FIG. 9).

As mentioned above, and as shown in FIG. 1, the environment 100 includes the client devices 106a-c. The client devices 106a-c may refer to various types of computing devices. For example, one or more of the devices may include a mobile device such as a mobile telephone, a smartphone, a personal digital assistant (PDA), a tablet, or a laptop. Additionally, or alternatively, one or more of the devices may include a non-mobile device such as a desktop computer. In addition, while each of the client devices 106a-c may refer to similar types of computing devices, the environment 100 can include different types of client devices in communication with the server device(s) 102 and/or third-party server device(s) 112.

Also mentioned above, and as shown in FIG. 1, the environment includes the server device(s) 102 and the third-party server device(s) 112. The server device(s) 102 and the third-party server device(s) 112 can generate, store, receive, and/or transmit any type of data, including security policies, security standards, and other related information. In one or more embodiments, the server device(s) 102 and the third-party server device(s) 112 may include data servers. The server device(s) 102 and the third-party server device(s) 112 may also include communication servers or web-hosting servers. In one or more embodiments, the server device(s) 102, 112 refers to a computing device and/or server device that provides administrative or IT service to the client devices 106a-c. Additional detail regarding client devices and server devices is provided below (e.g., in relation to FIGS. 8-9).

As shown in FIG. 1, the configuration management system 104 can generate or maintain security policies on the server device(s) 102. In one or more embodiments, the configuration management system 104 generates or maintains security policies based on security standards 114 on one or more third-party server device(s) 112. For example, the configuration management system 104 can generate security policies that define configuration states of a client device that comply with various checks or policies from a security standard 114 on a third-party server device 112 (e.g. published guidelines from a web server). In one or more embodiments, the configuration management system 104 obtains multiple security standards 114 from different server devices. For example, the configuration management system 104 can access information from a first security standard (e.g., CIS Standard) from a first third-party server while accessing information from a second security standard (e.g., STIG standard) from a second third-party server.

Once generated, the configuration management system 104 can provide the security policies to configuration management agents 108a-c (or simply "agents 108a-c") on respective client devices 106a-c. In one or more embodiments, the agents 108a-c include software agents associated with the configuration management system 104 installed on the respective client devices 106a-c. In addition, in one or more embodiments, the agents 108a-c may include similar or unique features and functionality based on the corresponding client device 106a-c. For example, a first agent 108a installed on a first client device 106a may include features and functionality unique to a first type of client device (e.g., a desktop computer) while a second agent 108b installed on a second client device 106b may include features and functionality unique to a second type of client device (e.g., a mobile device).

In one or more embodiments, the agents 108a-c are controlled by a master application (e.g., the configuration management system 104) running on an administrative system (e.g., an administrative device or server). Accordingly, in one or more embodiments, the agents 108*a-c* are responsible for executing commands sent by the configuration management system 104, report on the success of various jobs, and provide data about the management of the client devices 106*a-c*.

Upon receiving the security policies from the configuration management system 104, the agents 108*a-c* can enforce the security policies on the individual devices. For example, the agents 108*a-c* can enforce the security policies by performing operations to enforce configuration states defined by the security policies for configuration settings of the client devices 108*a-c*. In one or more embodiments, performing an enforcement operation includes performing an idempotent operation that modifies, maintains, or otherwise enforces a configuration setting to comply with a configuration state defined by a security policy. In addition, where the enforcement operation includes an idempotent operation, a scan and a fix of a configuration setting to comply with the security policy involve the same operation. Accordingly, the agents 108*a-c* can both scan and fix configuration settings by performing a single idempotent operation.

Moreover, as will be described in further detail below, the configuration management system 104 can further facilitate compliance of the client devices 106*a-c* with multiple security standards. For example, in providing the security policies to the client devices 106*a-c*, the configuration management system 104 can provide mapping information that associates configuration states defined by the security policies to one or multiple security standards. Indeed, where security standards often include similar guidelines for certain applications or devices, the configuration management system 104 can provide mapping information to enable the agents 108*a-c* to more efficiently enforce policies across multiple security standards without performing duplicate enforcement operations.

Although FIG. 1 illustrates a particular number and arrangement of client devices 106*a-c*, it will be understood that the environment 100 can include any number of devices, including any number of server devices, third-party server devices, or client devices. Moreover, one or more of the client devices 106*a-c* may directly communicate with the server device(s) 102 and/or the third-party server device(s) 112 or via an alternative network, bypass the network 110. For example, in one or more embodiments, rather than receiving security standard data from the server device(s), one or more of the client devices 106*a-c* may access security standard data directly from the third-party server device(s) 112 directly or via an alternative network.

Figure 2:
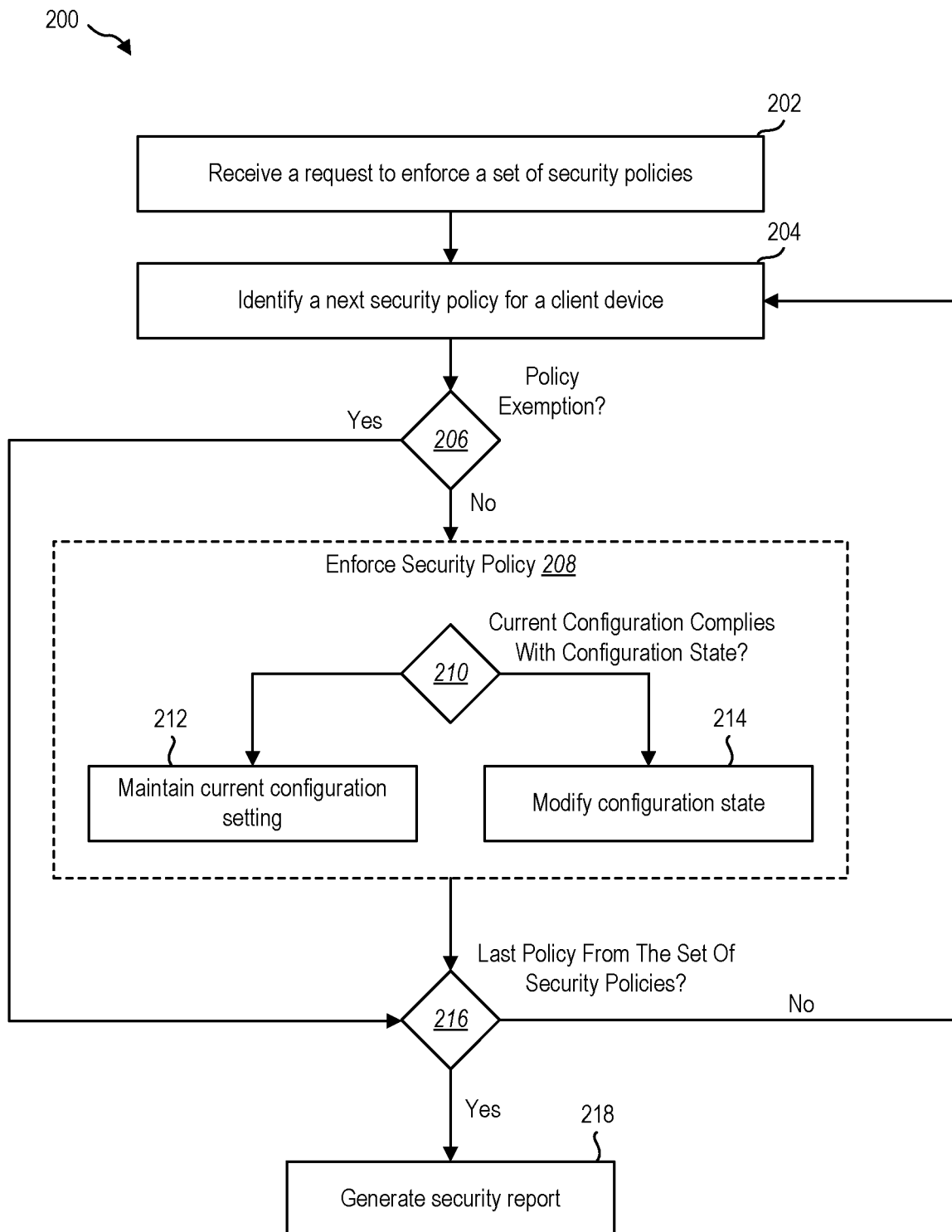
FIG. 2 illustrates a schematic diagram of implementing policy-driven enforcement of configuration settings on a computing device in accordance with one or more embodiments.

As mentioned above, the configuration management system 104 and agents 108*a-c* can cooperatively enforce security policies on the client devices 106*a-c*. For instance, FIG. 2 illustrates an example in which a client device (e.g., client device 106) having a configuration management agent (e.g., agent 108) thereon enforces a set of security policies provided by a configuration management system 104 on a server device(s) 102. For ease in explanation, client device 106 may refer to any of the client devices 106*a-c* described above in FIG. 1 while agent 108 may refer to any of the configuration management agents 108*a-c* implemented on the respective client devices 106*a-c*.

In particular, FIG. 2 illustrates an example series of acts 200 for enforcing any number of security policies on a client device 106. As shown in FIG. 2, the agent 108 may perform an act 202 of receiving a request to enforce a set of security policies. In one or more embodiments, the agent 108 receives a request to enforce a security standard including a set of configurations or policies to enforce on the client device 106. As an alternative, the agent 108 can receive a request to enforce a pre-selected set of security policies unique to or previously applied to the client device 106. In one or more embodiments, the agent 108 receives a request to enforce a select group of policies (e.g., a set of manually selected policies) that make up a subset of a particular standard or other smaller set of security policies to selectively enforce in response to a user command.

The request to enforce the set of security policies may refer to a user request or manual request to enforce the set of security policies. For example, the agent 108 may provide a selectable option (e.g., via a graphical user interface of the client device 106) that enables a user of the client device 106 to explicitly request enforcement of a set of security policies. Alternatively, the agent 108 may receive the request based on a periodic enforcement process. As an example, the agent 108 may periodically identify a set of security policies for enforcement based on a setting or protocol to establish secure configuration settings on the client device 106 at a predetermined frequency (e.g., every hour, every day). Alternatively, in one or more embodiments, the agent 108 dynamically identifies modifications to various configuration settings and receives or otherwise generates the request to enforce a set of security policies in response to detecting modifications to one or more configuration settings on the client device 106.

In one or more embodiments, the agent 108 receives or identifies a set of security policies based on a type of client device 106 and/or based on applications running or installed on the client device 106. For example, as an alternative to implementing a wholesale approach to enforcing security policies, the agent 108 can identify a select set of security policies unique to the client device 106 including security policies specific to settings that are common to the client device 106. In addition, the agent 108 can identify security policies based on identified applications on the client device 106.

As an illustrative example, where a client device 106 includes intended functionality that enables the client device 106 to connect wirelessly via a Bluetooth connection to other nearby electronic devices, the agent 108 may identify one or more security policies that relate to enforcing secure Bluetooth pairing configurations. Alternatively, where a client device 106 lacks specifications or functionality related to connecting wirelessly via a Bluetooth connection to nearby client devices, the agent 108 may omit one or more security policies related to enforcing secure Bluetooth pairing configurations. By selectively identifying a set of security policies based on specifications of the client device 106 and/or based on applications installed or running on the client device 106, the agent 108 can more efficiently enforce secure configuration settings on the client device 106 in accordance with relevant security policies.

As further shown, the agent 108 may perform an act 204 of identifying a next security policy for the client device 106. In initiating enforcement of the set of security policies, identifying the next security policy may simply involve identifying a first security policy from a set of security policies (e.g., as received from the configuration management system 104). Accordingly, as will be described in further detail below, the agent 108 can iteratively enforce security policies from a set of security policies identified by the agent 108 and/or configuration management system 104.

Upon identifying a security policy for enforcement, the agent 108 can perform an act 206 of determining whether an exemption applies to a security policy. For instance, in one or more embodiments, the agent 108 determines whether an exemption applies for a particular configuration setting and/or a policy that includes a configuration state associated with the configuration setting. For instance, certain corporate policies may permit knowing violations of one or more security policies while still maintaining compliance with one or more standards. As such, the agent 108 can determine whether a given policy is exempt from enforcement on a corresponding client device 106.

Where the agent 108 determines that an exemption applies to the security policy, the agent 108 can bypass enforcing the security policy on the client device 106 and select a new policy for enforcement. Alternatively, as shown in FIG. 2, where the agent 108 determines that an exemption does not apply, the agent 108 can proceed to perform an act 208 of enforcing the security policy on the client device 106. As mentioned above, the agent 108 can perform an operation of enforcing the security policy by causing a configuration setting to comply with a configuration state defined by the security policy. In one or more embodiments, the act 208 of performing the security policy involves performing an idempotent operation in which a check and a fix of a configuration setting to comply with a configuration state refer to the same operation.

As shown in FIG. 2, the act 208 of enforcing the security policy involves an act 210 of determining whether a current configuration setting complies with the configuration state defined by the security policy and further performing an act that remediates or otherwise enforces the configuration setting to comply with the indicated configuration state. In particular, as shown in FIG. 2, where the configuration setting complies with the configuration state defined by the security policy (e.g., where a current configuration setting is already the same as the configuration state), the agent 108 can perform an act 212 of maintaining a current configuration for the configuration setting associated with the configuration state. Alternatively, where the current configuration setting does not comply with the configuration state defined by the configuration policy (e.g., where a current configuration setting is not the same as the configuration state), the agent 108 can perform an act 214 of modifying the configuration state. For example, the agent can enforce the configuration state by changing the configuration setting to match or otherwise comply with the configuration state defined by the security policy.

As mentioned above, while the agent 108 may either maintain or modify a current configuration setting to match a configuration state defined by a security policy, in one or more embodiments, the agent 108 maintains a current configuration setting where the configuration setting complies with the corresponding configuration state, but does not necessarily match the configuration state defined by the security policy. For instance, while a configuration state may indicate a specific configuration setting, the configuration state may further indicate one or more configuration settings that are more secure or otherwise in compliance with a security standard. Accordingly, where a current configuration setting is more secure or otherwise in compliance with a configuration state, the agent 108 may maintain the current configuration setting even where the configuration setting and configuration state are not exactly the same.

As indicated above, the act 208 of enforcing the security policy may involve an idempotent operation in which the act 210 of determining whether the current configuration setting complies with the configuration state as well as the acts 212-214 of either maintaining the current configuration setting or modifying the configuration state involve performing the same operation by the client device 106. For example, on an initial instance of enforcing the configuration setting to comply with a security policy, the agent 108 may perform an idempotent operation that involves modifying the configuration setting to comply with the configuration state defined by the security policy. Because the enforcement operation involves an idempotent operation, unless the configuration setting changes after the initial enforcement, subsequent operations of enforcing the security policy will have no effect on the configuration setting because the check as well as the fix for the configuration setting are one and the same operation.

After enforcing the security policy, the agent 108 can additionally perform an act 216 of determining whether the security policy is the last policy from the set of security policies. As shown in FIG. 2, where the security policy is not the final security policy from the set of security policies, the agent 108 proceeds to perform the act 204 of identifying a next security policy. Alternatively, where the security policy is the final security policy from the set of security policies, the agent 108 performs an act 218 of generating a security report.

In particular, the agent 108 can generate a security report including information about enforcing the set of security policies. In one or more embodiments, generating the security report includes providing an audit report including an indication of any number of configuration settings that were modified as a result of enforcing the set of security policies. Alternatively, the agent 108 may generate a security report including an indication of any number of configuration settings as well as an indication of whether or not the configuration settings were modified or maintained. In one or more embodiments, a security report can include an indication of one or more exemptions that may apply to the configuration settings as well as an indication as to whether the configuration setting is in compliance with one or more security policies (regardless of whether it was enforced by the agent 108).

In addition to generating a security report including information about enforcing the set of security policies, the agent 108 can additionally provide one or more additional options related to securing the client device 106. For example, the agent 108 can generate and provide one or more selectable options that enable a user of the client device 106 to enforce one or more additional security policies (e.g., from different security standards), to override one or more exemptions that bypassed one or more security policies, or perform one or more other actions by the client device. Additional detail will be discussed by way of example in connection with FIG. 5 below.

While FIG. 2 illustrates an example in which an agent 108 receives a request to enforce a select set of security policies, in one or more embodiments, the agent 108 implements a more dynamic approach to identifying and enforcing security policies. For example, in an effort to avoid overutilizing bandwidth overhead, the agent 108 can maintain an active connection with the configuration management system 104. For instance, rather than periodically polling a cloud server like many conventional scanning application, the agent 108 can use asynchronous algorithms that minimize network overhead by maintaining an active connection. Indeed, by maintaining an active connection, the agent 108 can avoid transmission of large data files every few minutes as required by many polling mechanisms and which can quickly become outdated.

For instance, where a configuration setting often changes, a polling mechanism may fail to accurately identify a current state of a configuration setting that periodically falls out of compliance with a security standard. In contrast, the agent 108 maintains an active connection with a cloud server that can be called on at any time (e.g., by providing a request to secure a client device), which enables the agent 108 to immediately enforce current states of configuration settings to comply with security policies. In this way, rather than periodically transmitting large blocks of data (e.g., 1-20 MB data blocks) at set intervals, the agent 108 can simply send an indication of a request for enforcement. By implementing an active agent in this way, the agent 108 can enforce security policies using small, targeted communications (e.g., 1-20 kB downloads) rather than larger, redundant communications (e.g., 1-20 MB downloads).

As mentioned above, the agent 108 implements a policy-driven approach to securing a client device from potential security threats. For example, the agent 108 can identify any number of security policies to enforce on a client device 106. The agent 108 can identify single policies for enforcement, a set of manually selected policies, or policies that are unique to the client device 106. In addition, or as an alternative, the agent 108 can identify a set of security policies that correspond to a security standard. In particular, the agent 108 can identify a set of policies that satisfy a security standard or, alternatively a set of policies that satisfies multiple security standards.

Figure 3:
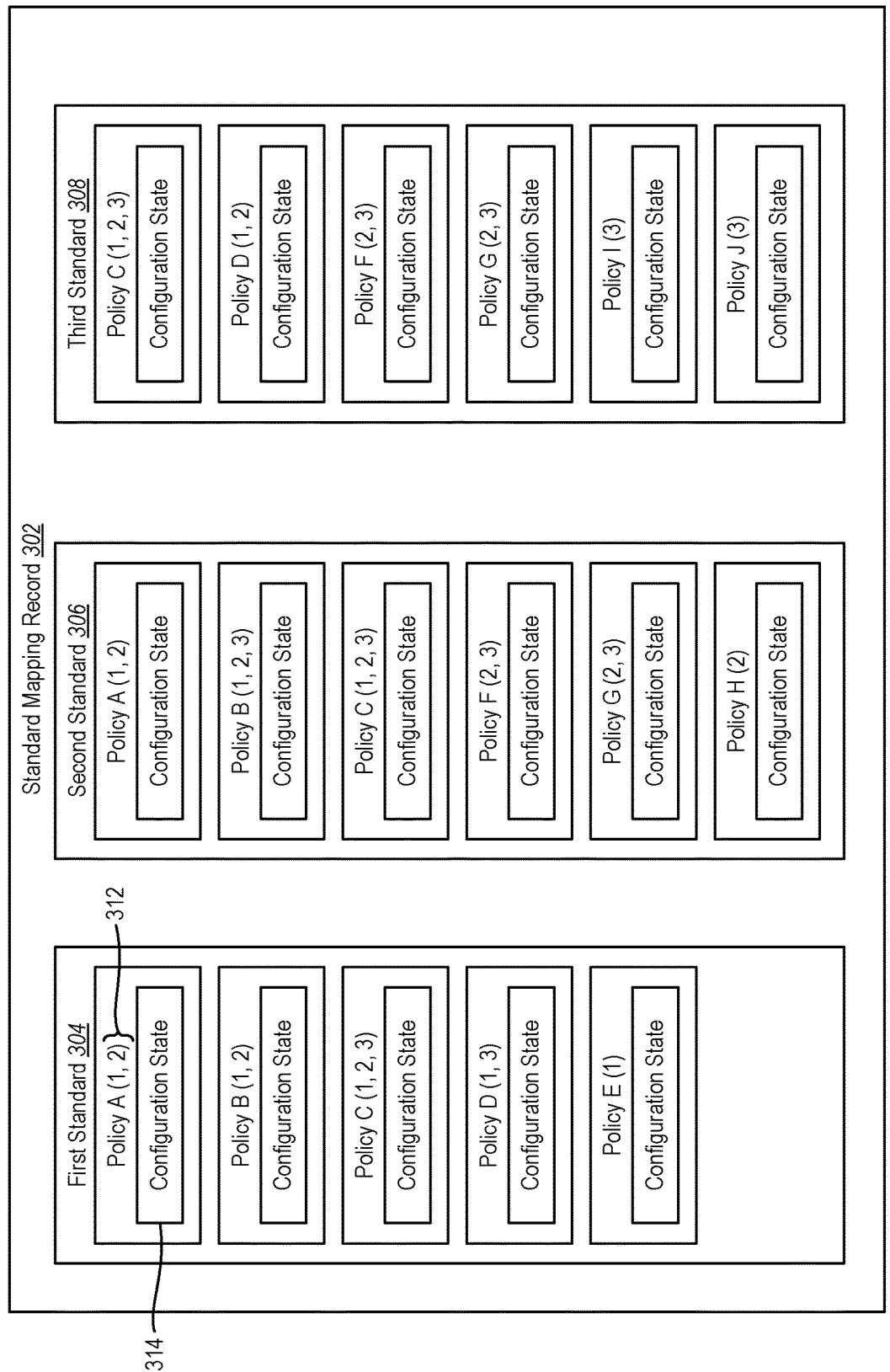
FIG. 3 illustrates an example mapping record including a mapping between security policies and security standards in accordance with one or more embodiments.

As indicated above, the security policies may include configuration states as well as mapping information that associates the configuration states defined by the security policies with corresponding security standards. In one or more embodiments, the agent 108 identifies the configuration states and mapping information from a record of policy data including the security policies and associated data. FIG. 3 illustrates an example standard mapping record 302 in accordance with one or more embodiments which includes policy data that an agent 108 may use in identifying a set of security policies to enforce on a client device 106.

As illustrated in FIG. 3, the standard mapping record 302 includes any number of policies grouped according to security standards. In particular, the standard mapping record 302 includes data for a first standard 304 (i.e., a first security standard) including policies A-E representative of a set of configuration states that would place a client device 106 in compliance with the first standard 304. The standard mapping record 302 further includes data for a second standard 306 including policies A-C and F-H. As shown in FIG. 3, the standard mapping record 302 includes data for a third standard 308 including policies C-D, F-G, and I-J.

While FIG. 3 illustrates three generic standards 304-308 including an arbitrary number of security policies, the mapping record may include any number of security policies corresponding to any number of security standards. As an example, the standard mapping record 302 may include policies from a CIS standard, STIG standard, HIPAA standard, or other security standard(s) that include hundreds or thousands of checks to determine compliance with a particular standard.

As shown in FIG. 3, each of the security policies include a configuration state and corresponding mapping information. For example, policy A includes a configuration state 314 and mapping information indicating that a configuration setting in compliance with the configuration state 314 would place that configuration setting in compliance with both the first standard 304 and the second standard 306. Each of the additional policies (e.g., policies B-J) include similar information (e.g., a configuration state and mapping information).

In addition, while each of the illustrated policies include a single configuration state, the individual policies may include one or multiple configuration states in compliance with a corresponding security standard. As an example, where multiple configuration states may be secure in accordance with a security standard, the agent 108 may avoid performing one or more redundant enforcement operations with respect to a security policy by maintaining a configuration state for one or more configuration settings that match or otherwise comply with any of the associated configuration states defined by the security policy.

As shown in FIG. 3 and as indicated by the mapping information of the respective security policies, one or more of the security standards 304-308 include some or all of the same policies as other standards within the standard mapping record 302. For example, the mapping information 312 of policy A indicates that enforcing the configuration state 314 places a configuration setting associated with the configuration state 314 in compliance with both the first security standard 304 and the second security standard 306.

As a result of the overlap in the mapping information, the agent 108 can more efficiently facilitate compliance of a client device across multiple security standards. Moreover, even where enforcing compliance with a single security standard (e.g., first standard 304), the agent 108 can determine a level of compliance with one or more additional security standards based on which policies from the first security standard also apply to other security standards within the standard mapping record 302.

For instance, by enforcing the security policies from the first security standard 304, the agent 108 can determine that at least 50% of the configuration settings of a client device 106 already comply with configuration states defined by policies from the second security standard 306 without scanning or otherwise enforcing any of the security policies of the second security standard 306. Accordingly, subsequent to enforcing the first security standard 304 and in response to receiving a request to additionally enforce the second security standard 306, the agent 108 can forego performing any operations for enforcing policies A-C, and enforce all the policies of the second security standard 306 by selectively enforcing policies F-H (e.g., without performing additional operations with regard to policies A-C).

Figure 4:
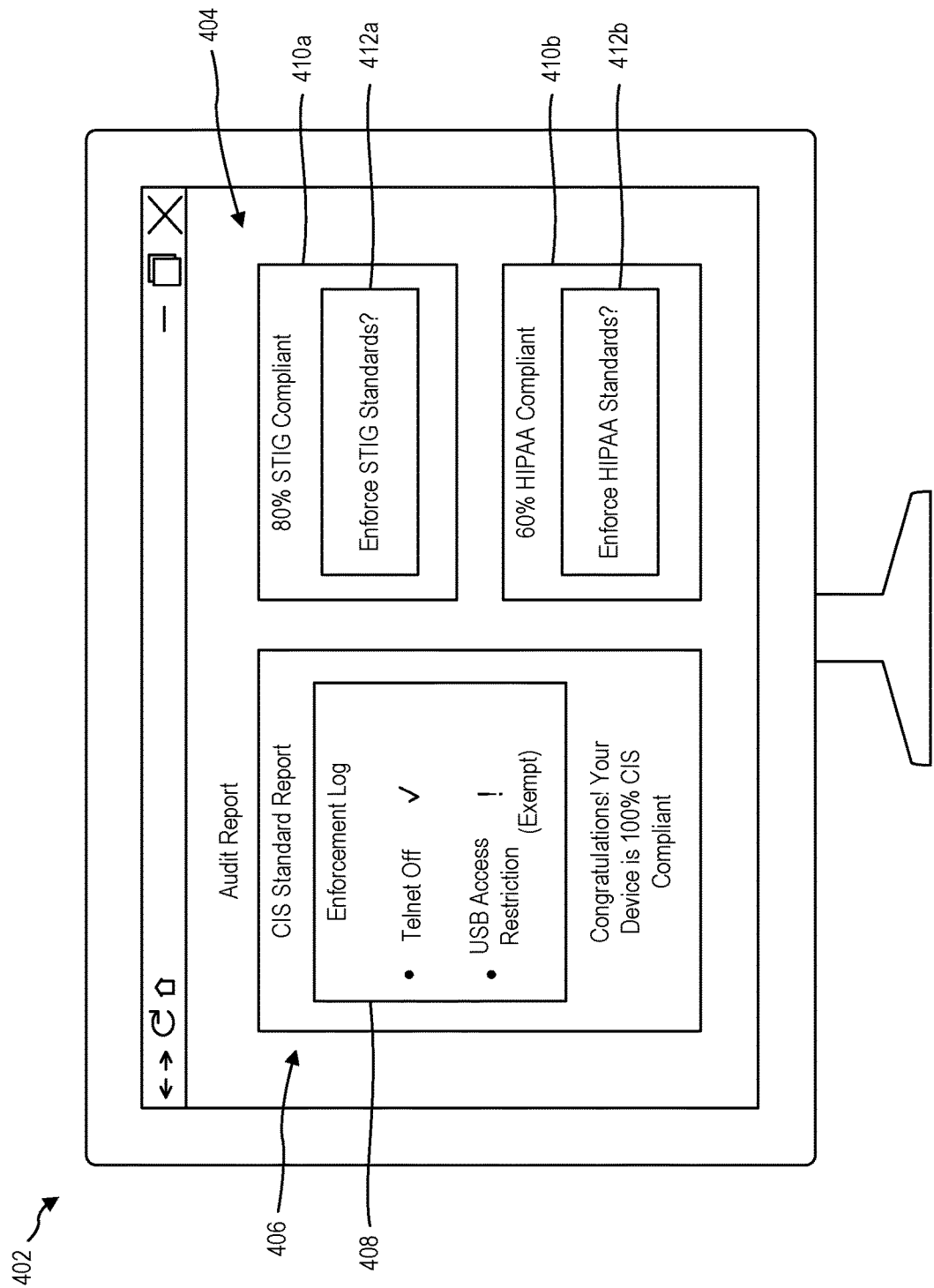
FIG. 4 illustrates an example computing device including a graphical user interface for providing a report including information about enforcing security policies in accordance with one or more embodiments.

As mentioned above, the agent 108 can generate and provide a security report (e.g., an audit report) based on any actions performed in causing a client device to comply with one or more security standards. FIG. 4 illustrates an example in which a configuration management agent (or simply "agent") on a client device 402 provides an audit report including information associated with enforcing security policies from a security standard. As shown in FIG. 4, the client device 402 includes a graphical user interface 404 on which an agent thereon generates and provides an audit report 406 including information associated with enforcing the policies corresponding to a security standard.

In the example shown in FIG. 4, upon enforcing a set of security policies corresponding to a CIS security standard, the agent generates and presents an audit report including a CIS standard report showing results of enforcing security policies for the CIS security standard in accordance with one or more embodiments described herein. As shown in FIG. 4, the audit report 406 includes a listing of enforcement actions 408 in which one or more configuration settings were modified or exempt. For example, where enforcing a security policy includes a configuration state indicating that a Telnet application should be off results in a Telnet application on the client device 402 being turned off from an on status, the audit report 406 includes an indication of the change in status of the configuration setting as a result of performing the enforcement operation.

As another example, the audit report 406 may include an indication of one or more security policies for which one or more exemptions apply for the client device 402. For instance, where an agent bypasses performing an enforcement operation for a configuration setting, the audit report may similarly include one or more indications that the configuration settings are exempt from complying with one or more corresponding security policies. As shown in FIG. 4, the client device 402 has an exemption with regard to using a universal serial bus (USB) device where the CIS standard generally prohibits USB access. Accordingly, the agent may include an indication of the USB access restriction exemption, as indicated in FIG. 4.

As further shown in FIG. 4, the agent may include an indication of a level of compliance with one or more security standards. For example, as a result of enforcing (e.g., scanning and remediating) security policies for the CIS standard, the agent may determine a level of compliance with one or more additional security standards (e.g., a STIG security standard and a HIPAA security standard). In particular, based on mapping information associating security policies from a set of security policies corresponding to the CIS standard, the agent may determine that, without performing any additional enforcement operations, the client device 402 is already 80% STIG compliant and 60% HIPAA compliant, as indicated on the graphical user interface 404 of the client device 402. Accordingly, the agent provides a first compliance indicator 410a for the STIG security standard as well as a second compliance indicator 410b for the HIPAA security standard.

In one or more embodiments, the agent additionally provides one or more selectable options for placing the client device 402 in compliance with one or more additional security standards. For example, as shown in FIG. 4, the agent can provide a first selectable option 412a for enforcing security policies to place the client device 402 in compliance with a STIG security standard. The agent can additionally provide a second selectable option 412b for enforcing security policies to place the client device 402 in compliance with a HIPAA security standard.

Because the client device 402 is already partially in compliance with the other security standards (e.g., STIG and HIPAA), in response to detecting a selection of the selectable options (e.g., a user selection of a graphical icon), the agent may bring the client device 402 in compliance with a corresponding security standard by enforcing only those security policies that are not applicable to the already compliance security standard. For example, in response to detecting a selection of the first selectable option to enforce the STIG security standard, an agent on the client device 402 may bypass performing any operations on the 80% of the security policies already enforced and selectively enforce the remaining 20% of security policies associated with the STIG security policy. In this way, the client device 402 avoids performing redundant operations in bringing the configuration settings of the client device 402 in compliance with the STIG security standard.

Moreover, upon enforcing both the security policies for the CIS security standard and additional security policies for the STIG security standard, the agent may provide an updated audit report as well as an updated measure of compliance of one or more additional security standards. For example, where enforcing security policies to bring configuration settings of the client device 402 in compliance with both the CIS security standard and the STIG security standard brings the client device 90% in compliance with a HIPAA security standard (e.g., as a result of security policies in common between the STIG standard and the HIPAA standard), the agent can provide an indication of the 90% compliance via the graphical user interface 404 similar to the example shown in FIG. 4. In addition, a user can subsequently select another selectable option to enforce any remaining security policies of the HIPAA security standard not previously enforced in complying with the CIS and STIG standards.

Figure 5:
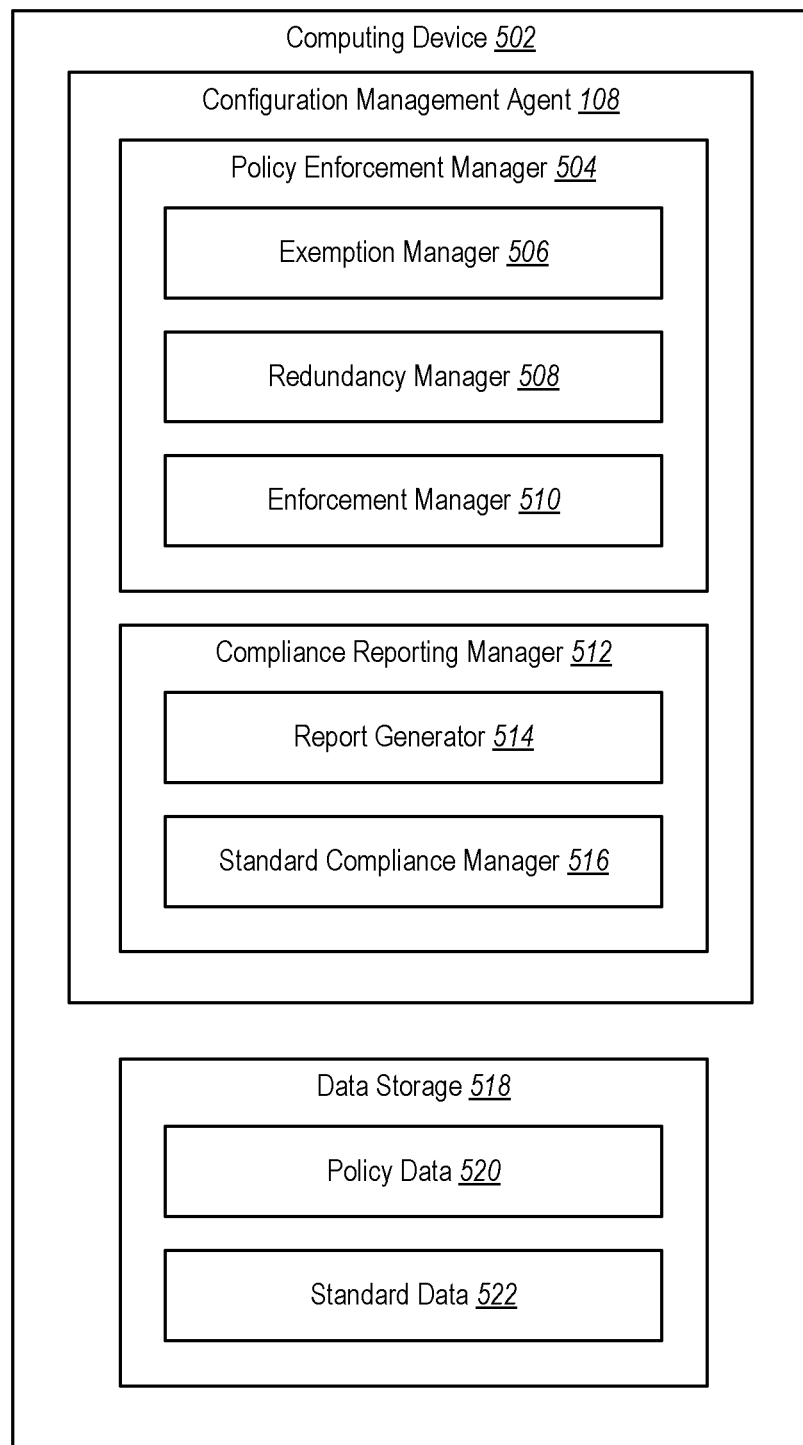
FIG. 5 illustrates an example architecture of a configuration management agent implemented on a computing device in accordance with one or more embodiments.

Turning now to FIG. 5, additional detail will now be provided regarding components and capabilities of an example architecture for a configuration management agent 108 on a computing device 502 in accordance with one or more embodiments described herein. As mentioned above, the configuration management agent 108 may be implemented in whole or in part on a client device, which may be one embodiment of the computing device 502 shown in FIG. 5. Alternatively, one or more components of the configuration management agent 108 may be implemented in whole or in part on a server device(s) 102 (e.g., as part of a configuration management system 104), as discussed above in the environment shown in FIG. 1.

As shown in FIG. 5, the configuration management agent 108 includes a policy enforcement manager 504 for performing one or more actions related to enforcing security policies. For example, in accordance with one or more embodiments described above, the policy enforcement manager 504 may identify any number of policies for enforcement on the computing device 502 for placing configuration settings of the computing device 502 in compliance with a set of security policies. In one or more embodiments, the set of security policies refers to a set of security policies corresponding to a security standard. The set of security policies may include additional or fewer policies in accordance with one or more embodiments.

As shown in FIG. 5, the policy enforcement manager 504 includes an exemption manager 506. In one or more embodiments, the exemption manager 506 identifies whether an exemption applies to a security policy or configuration setting associated with a security policy. For example, where a user of the computing device 502 is an administrator of a system or network of client devices, the exemption manager 506 may provide a higher level of access to one or more configuration settings by exempting the computing device 502 from enforcement of one or more security policies. Indeed, where the exemption manager 506 identifies an applicable exemption, the configuration management agent 108 may simply bypass enforcement of a security policy while still maintaining compliance with an associated security standard.

As illustrated in FIG. 5, the policy enforcement manager 504 further includes a redundancy manager 508. In one or more embodiments, the redundancy manager 508 reduces redundancy of enforcing security policies by checking whether one or more security policies have previously been enforced in causing the computing device to comply with one or more security standards. For example, where the configuration management agent 108 has received a request to enforce two sets of security policies that place the computing device 502 in compliance with two different security standards that have significant overlap in security policies, the redundancy manager 508 can access mapping information or otherwise identify which security policies have been enforced in performing enforcement operations for a first security standard and avoid performing redundant enforcement operations in enforcing the second security standard. Accordingly, in complying with multiple security standards, the redundancy manager 508 can facilitate avoiding enforcement of the same security policies more than once, even where enforcing multiple security standards simultaneously.

The policy enforcement manager 504 further includes an enforcement manager 510. In one or more embodiments, the enforcement manager 510 implements a policy-driven approach to securing the computing device 502 by performing operations to enforce any number of identified security policies. For example, the enforcement manager 510 can perform enforcement operations of scanning and fixing one or more configuration settings to comply with configuration states defined by the identified security policy. In one or more embodiments, the enforcement manager 510 enforces the security policies by performing idempotent operations in which a scan and a fix of a configuration setting are the same operation.

As further shown in FIG. 5, the configuration management agent 108 includes a compliance reporting manager 512 for generating and providing audit reports including information associated with enforcing security policies on the computing device 502. For example, the compliance reporting manager 512 includes a report generator 514 that generates an audit report including an indication of one or more modifications to configuration settings made by the enforcement manager 510. In addition, the report generator 514 can generate a report including one or more exemptions that apply to the computing device 502.

As described in one or more embodiments above, the report generator 514 can generate an audit report for presentation via a graphical user interface of the computing device 502. In addition, or as an alternative, the report generator 514 can generate an audit report including information about enforcing security policies and provide the audit report to a cloud server or other computing device(s) (e.g., server device(s) 102).

As further shown in FIG. 5, the compliance reporting manager 512 includes a standard compliance manager 516 that determines a level of compliance with one or more security standards. For example, in one or more embodiments, the standard compliance manager 516 accesses mapping information associating various security policies with corresponding security standards and determines a level or extent to which the computing device 502 complies with one or more security standards. In one or more embodiments, the standard compliance manager 516 provides an indication of a level of compliance with one or multiple security standards. In addition, the standard compliance manager 516 can provide an indication of what additional security policies are applicable for completing compliance of the computing device 502 with a corresponding security standard(s).

In one or more embodiments, the computing device 502 additionally includes data storage 518 including data for implementing a policy-driven approach to securing the computing device. For example, as shown in FIG. 5, the data storage 518 includes policy data 520 including any information that makes up a security policy. For example, policy data 520 may include a configuration state for an associated configuration setting. In one or more embodiments, the policy data 520 can include multiple configuration states that are in compliance with a corresponding security standard. In one or more embodiments, the computing device 502 accesses the policy data 520 from a server device for storage on the computing device 502.

The data storage 518 can further include standard data 522 including any information associated with a security standard. For example, the standard data 522 may include a list of checks and configuration states associated with complying with a specific security standard. For example, standard data 522 may include configuration states that would place a computing device 502 in compliance with a security standard. Alternatively, standard data 522 can include an indication of configuration states out of compliance with a corresponding security standard. In one or more embodiments, the computing device 502 receives or otherwise accesses the standard data 522 from a third-party server device, as discussed above in connection with FIG. 1.

In one or more embodiments, each of the components of the configuration management agent 108 are in communication with one another using any suitable communication technologies. Additionally, the components of the configuration management agent 108 can be in communication with one or more other devices including the server device(s) 102 and the third-party server device(s) 112 discussed above. It will be recognized that although the components of the configuration management agent 108 are shown to be separate in FIG. 5, any of the subcomponents may be combined into fewer components, such as into a single component, or divided into more components as may serve a particular embodiment.

Furthermore, although the components of FIG. 5 are described in connection with a configuration management agent 108, at least some of the components for performing operations described herein may be implemented on other devices within an environment (e.g., the environment 100 of FIG. 1).

The components of the configuration management agent 108 can include software, hardware, or both. For example, the components of the configuration management agent 108 can include one or more instructions stored on a computer-readable storage medium and be executable by processors of one or more computing devices. When executed by the one or more processors, the computer-executable instructions of the configuration management agent 108 can cause the computing device 502 to perform the methods described herein. Alternatively, the components of the configuration management agent 108 can comprise hardware, such as a special-purpose processing device to perform a certain function or group of functions. Additionally, or alternatively, the components of the configuration management agent 108 can include a combination of computer-executable instructions and hardware.

Figure 6:
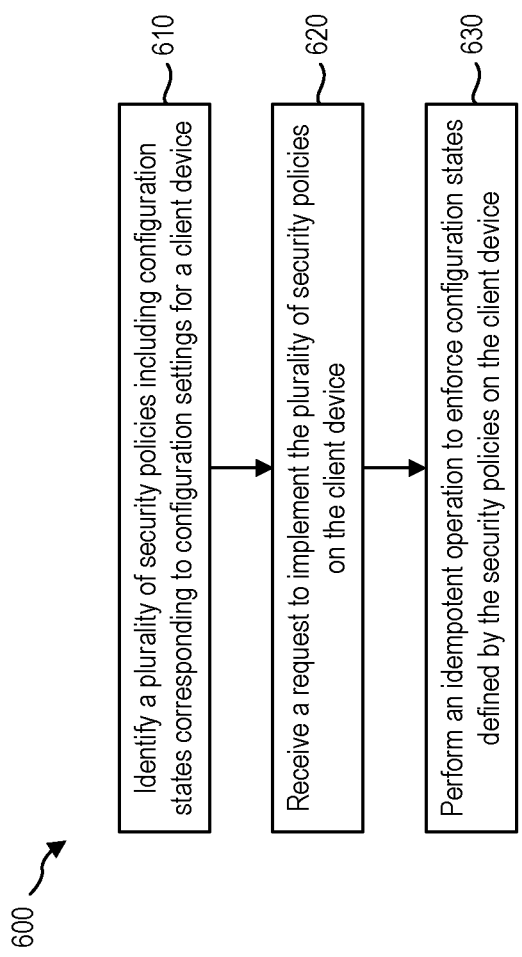
FIG. 6 illustrates a flowchart of an example series of acts for enforcing a plurality of security policies on a client device in accordance with one or more embodiments.
Figure 7:
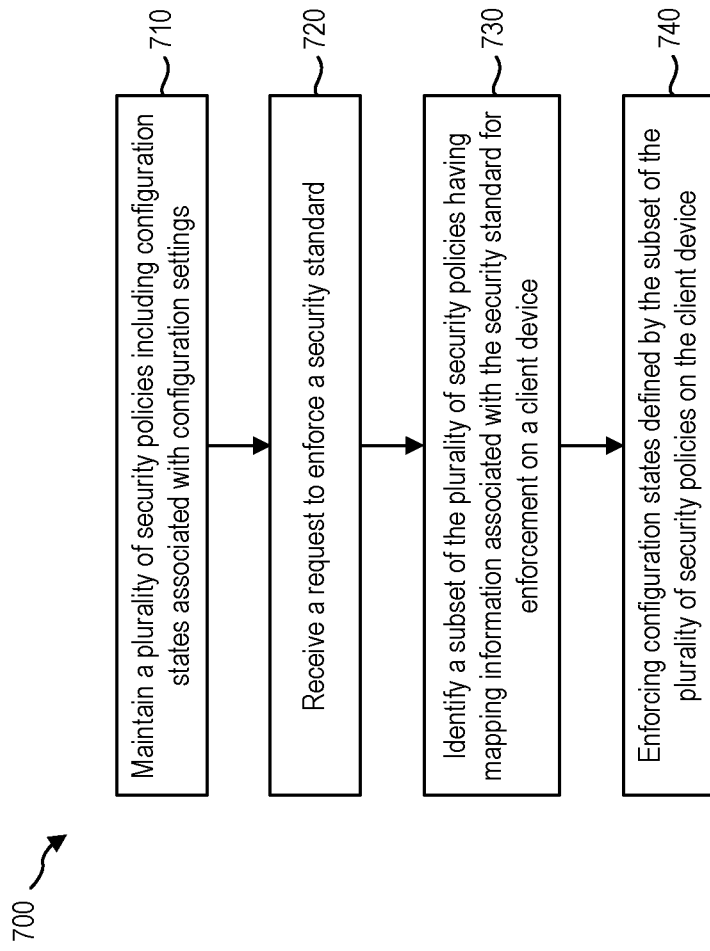
FIG. 7 illustrates a flowchart of an example series of acts for implementing a policy-driven approach to enforcing security policies based on an identified security standard in accordance with one or more embodiments.

Turning now to FIGS. 6-7, these figures illustrate flowcharts including example series of acts for implementing a policy-driven approach to enforce security policies on a computing device. While FIGS. 6-7 illustrate acts according to one or more embodiments, alternative embodiments may omit, add to, reorder, and/or modify any of the acts shown in FIGS. 6-7. The acts of FIGS. 6-7 can be performed as part of a method. Alternatively, a non-transitory computer-readable storage medium can include instructions that, when executed by one or more processors, cause a computing device to perform the acts of FIGS. 6-7. In still further embodiments, a system can perform the acts of FIGS. 6-7.

For example, as illustrated in FIG. 6, the series of acts 600 includes an act 610 of identifying a plurality of security policies including configuration states corresponding to configuration settings for a client device. For instance, in one or more embodiments, the act 610 includes identifying a plurality of security policies, the plurality of security policies comprising a plurality of configuration states associated with configuration settings of the client device. In one or more embodiments, the configuration settings of the client device refer to one or more settings of an application or operating system on the client device. In addition, in one or more embodiments, the configuration settings include settings that grant or restrict access to intended functionality of the application or operating system on the client device.

In addition to identifying or generally accessing the security policies, in one or more embodiments, the series of acts 600 includes maintaining the plurality of security policies (e.g., on a client device or server device). For example, in one or more embodiments, the series of acts 600 includes maintaining plurality of security policies including the plurality of configuration states associated with configuration settings of the client device.

As further shown in FIG. 6, the series of acts 600 includes an act 620 of receiving a request to implement the plurality of security policies on the client device. For example, in one or more embodiments, the act 620 includes receiving a request to implement the plurality of security policies on the client device.

As further shown in FIG. 6, the series of acts 600 includes an act 630 of performing an idempotent enforcement operation to enforce configuration states defined by the security policies on the client device. For example, in one or more embodiments, the act 630 includes, for a security policy from the plurality of security policies, performing an operation to enforce a configuration state for a corresponding configuration setting of the client device where the operation to enforce the configuration state includes an idempotent operation in which a check and a fix of a configuration setting to comply with the configuration state are the same operation. In one or more embodiments, performing the operation to enforce the configuration state includes performing the operation by an agent on the client device. In one or more embodiments, the agent includes a software application that maintains an active connection with a master agent on a server device that maintains the plurality of security policies.

In one or more embodiments, performing the operation includes enforcing a configuration setting to comply with the configuration state defined by the security policy regardless of a current state of the configuration setting prior to receiving the request to implement the plurality of security policies on the client device. In one or more embodiments, if the current state of the configuration setting complies with the configuration state defined by the security policy, then performing the operation to enforce the configuration setting to correspond to the configuration state has no effect on the current state of the configuration setting. Alternatively, if the current state of the configuration setting does not comply with the configuration state defined by the security policy, then performing the operation to enforce the configuration setting to correspond to the configuration state comprises modifying the current state of the configuration setting to comply with the configuration state defined by the security policy.

In one or more embodiments, the series of acts 600 includes performing multiple operations to enforce configuration states defined by corresponding security policies from the plurality of security policies. In one or more embodiments, performing the multiple operations includes scanning a plurality of configuration settings and remediating one or more configuration settings of the plurality of configuration settings in response to a single user input indicating the request to implement the plurality of security policies on the client device. Further, in one or more embodiments, performing the multiple operations includes performing acts of scanning the plurality of configuration settings and remediating the one or more configuration settings by a single software agent.

In one or more embodiments, the series of acts 600 includes identifying an exemption that applies to the client device for a given security policy. In addition, performing the operation to enforce a configuration state for a configuration setting defined by the given security policy may include bypassing the given security policy while enforcing one or more additional security policies from the plurality of security policies.

In one or more embodiments, the series of acts further includes generating an audit report for the request to implement the plurality of security policies on the client device. The audit report may include an indication of one or more actions taken by an agent on the client device based on differences between one or more current states of configuration settings on the client device and one or more configuration states defined by the plurality of security policies.

FIG. 7 illustrates another series of acts for implementing a policy-driven approach to enforcing security policies on a computing device. For example, as illustrated in FIG. 7, the series of acts 700 includes maintaining a plurality of security policies including configuration states associated with configuration settings. For example, in one or more embodiments, the act 710 includes maintaining a plurality of security policies that include a plurality of configuration states associated with configuration settings of a client device in addition to mapping information associating the plurality of security policies to a plurality of security standards. In one or more embodiments, the configuration settings of the client device refer to one or more settings of an application or operating system on the client device that grant or restrict access to one or more intended functionalities of the application or operating system.

As shown in FIG. 7, the series of acts 700 further includes an act 720 of receiving a request to enforce a security standard. For example, in one or more embodiments, the act 720 includes receiving a request to enforce a first security standard from the plurality of security standards. The security standards may include two or more of Center for Internet Security (CIS) standards, Standard Technical Implementation Guide (STIG) standards, Payment Card Industry (PCI) standards, and Health Insurance Portability and Accountability Act (HIPAA) standards.

As further shown in FIG. 7, the series of acts 700 includes an act 730 of identifying a subset of the plurality of security policies having mapping information associated with the security standard for enforcement on a client device. For example, in one or more embodiments, the act 730 includes identify a subset of security policies from the plurality of security policies having mapping information associated with the first security standard for enforcement on the client device. In one or more embodiments, the series of acts 700 includes generating the mapping information for the plurality of security policies by mapping the plurality of configuration states associated with configuration settings of the client device to respective security standards from the plurality of security standards.

As further shown in FIG. 7, the series of acts 700 includes an act 740 of enforcing configuration states defined by the subset of the plurality of security policies on the client device. For example, in one or more embodiments, the act 740 includes performing (e.g., causing a client device to perform) an operation to enforce a configuration state for a corresponding configuration setting defined by a security policy from the identified subset of security policies. In one or more embodiments, the operation to enforce the configuration state includes an idempotent operation in which a check and a fix of the security policy are the same operation. In addition, in one or more embodiments, performing the idempotent operation includes enforcing a configuration setting to correspond to the configuration state defined by the security policy regardless of a current state of the configuration setting prior to receiving the request to implement the plurality of security policies on the client device.

In one or more embodiments, the series of acts 700 further includes receiving a report including information associated with enforcing the subset of security policies on the client device. The series of acts 700 can further include generating a compliance report indicating a measure of compliance with the first security standard. In one or more embodiments, generating the compliance report includes identifying a second subset of security policies having mapping information associated with a second security standard. Generating the compliance report can further include, based on overlap between mapping information for the subset of security policies and the mapping information associated with the second security standard, providing, within the compliance report, an indication of a second measure of compliance with the second security standard.

In one or more embodiments, the series of acts 700 further include providing an option to request enforcement of the second security standard. The series of acts 700 can also include receiving a request to enforce the second security standard indicated in the compliance report and identifying a second subset of security policies from the plurality of security policies having mapping information associated with the second security standard for enforcement on the client device. Enforcing the first security standard may involve causing the client device to perform one or more operations to enforce one or more configuration states for one or more corresponding configuration settings defined by the second subset of security policies. In one or more embodiments, enforcing the second security standard includes bypassing enforcement of the one or more security policies in common between the subset of security policies and the second subset of security policies based on a determination that the one or more configuration states are already in compliance with the one or more security policies when the subset of security policies were enforced in response to receiving the request to enforce the first security standard.

Embodiments of the present disclosure may comprise or utilize a special-purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable storage medium and executable by one or more computing devices (e.g., any of the media content access devices described herein). In general, a processor (e.g., a microprocessor) receives instructions from a non-transitory computer-readable storage medium (e.g., memory) and executes those instructions, thereby performing one or more processes, including one or more of the processes described herein.

Computer-readable media can be any available media that can be accessed by a general-purpose or special-purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) include random access memory (RAM), read-only memory (ROM), electrically erasable programmable read-only memory (EEPROM), CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general-purpose or special-purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links which can be used to carry desired program code means in the form of computer-executable instructions or data structures and which can be accessed by a general-purpose or special-purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special-purpose computer, or special-purpose processing device to perform a certain function or group of functions. In some embodiments, computer-executable instructions are executed by a general-purpose computer to turn the general-purpose computer into a special-purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 8:
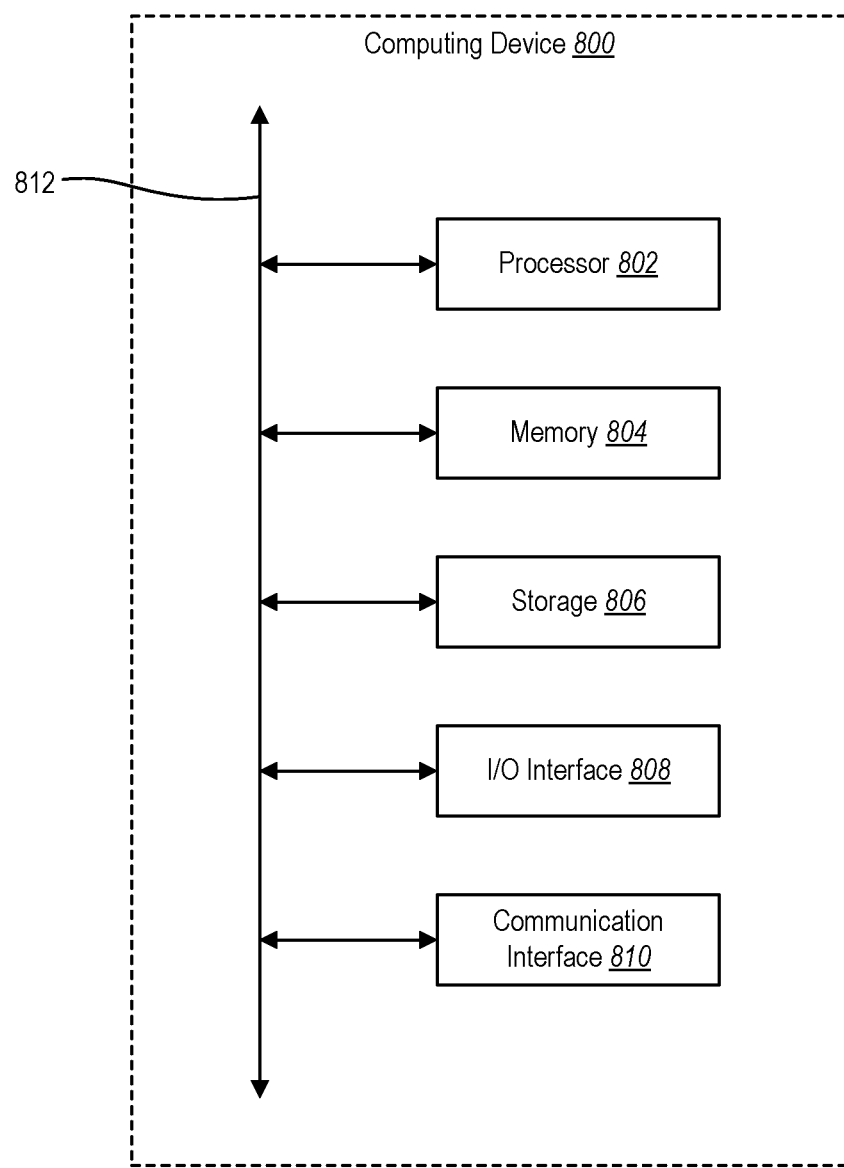
FIG. 8 illustrates a block diagram of a computing device in accordance with one or more embodiments.

FIG. 8 illustrates a block diagram of an example computing device 800 that may be configured to perform one or more of the processes described above. One will appreciate that one or more computing devices, such as the computing device 800, may represent the computing devices described above in connection with one or more embodiments (e.g., client devices and/or server devices). In one or more embodiments, the computing device 800 may be a mobile device (e.g., a mobile telephone, a smartphone, a PDA, a tablet, a laptop, a camera, a tracker, a watch, a wearable device, etc.). In some embodiments, the computing device 800 may be a non-mobile device (e.g., a desktop computer or another type of client device). Further, the computing device 800 may be a server device that includes cloud-based processing and storage capabilities.

As shown in FIG. 8, the computing device 800 can include one or more processor(s) 802, memory 804, a storage device 806, input/output interfaces 808 (or "I/O interfaces 808"), and a communication interface 810, which may be communicatively coupled by way of a communication infrastructure (e.g., bus 812). While the computing device 800 is shown in FIG. 8, the components illustrated in FIG. 8 are not intended to be limiting. Additional or alternative components may be used in other embodiments. Furthermore, in certain embodiments, the computing device 800 includes fewer components than those shown in FIG. 8. Components of the computing device 800 shown in FIG. 8 will now be described in additional detail.

In particular embodiments, the processor(s) 802 includes hardware for executing instructions, such as those making up a computer program. As an example, and not by way of limitation, to execute instructions, the processor(s) 802 may retrieve (or fetch) the instructions from an internal register, an internal cache, memory 804, or a storage device 806 and decode and execute them.

The computing device 800 includes memory 804, which is coupled to the processor(s) 802. The memory 804 may be used for storing data, metadata, and programs for execution by the processor(s). The memory 804 may include one or more of volatile and non-volatile memories, such as random-access memory ("RAM"), read-only memory ("ROM"), a solid-state disk ("SSD"), Flash, phase change memory ("PCM"), or other types of data storage. The memory 804 may be internal or distributed memory.

The computing device 800 includes a storage device 806 that includes storage for storing data or instructions. As an example, and not by way of limitation, the storage device 806 can include a non-transitory storage medium described above. The storage device 806 may include a hard disk drive (HDD), flash memory, a Universal Serial Bus (USB) drive or a combination of these or other storage devices.

As shown, the computing device 800 includes one or more I/O interfaces 808, which are provided to allow a user to provide input to (such as user strokes), receive output from, and otherwise transfer data to and from, the computing device 800. These I/O interfaces 808 may include a mouse, a keypad or a keyboard, a touchscreen, a camera, an optical scanner, a network interface, a modem, other known I/O devices, or a combination of such I/O interfaces 808. The touchscreen may be activated with a stylus or a finger.

The I/O interfaces 808 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 808 are configured to provide graphical data to a display for presentation to a user. The graphical data may be representative of one or more graphical user interfaces and/or any other graphical content as may serve a particular implementation.

The computing device 800 can further include a communication interface 810. The communication interface 810 can include hardware, software, or both. The communication interface 810 provides one or more interfaces for communication (such as, for example, packet-based communication) between the computing device and one or more other computing devices or one or more networks. As an example, and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI network. The computing device 800 can further include a bus 812. The bus 812 can include hardware, software, or both, that connects components of computing device 800 to each other.

Figure 9:
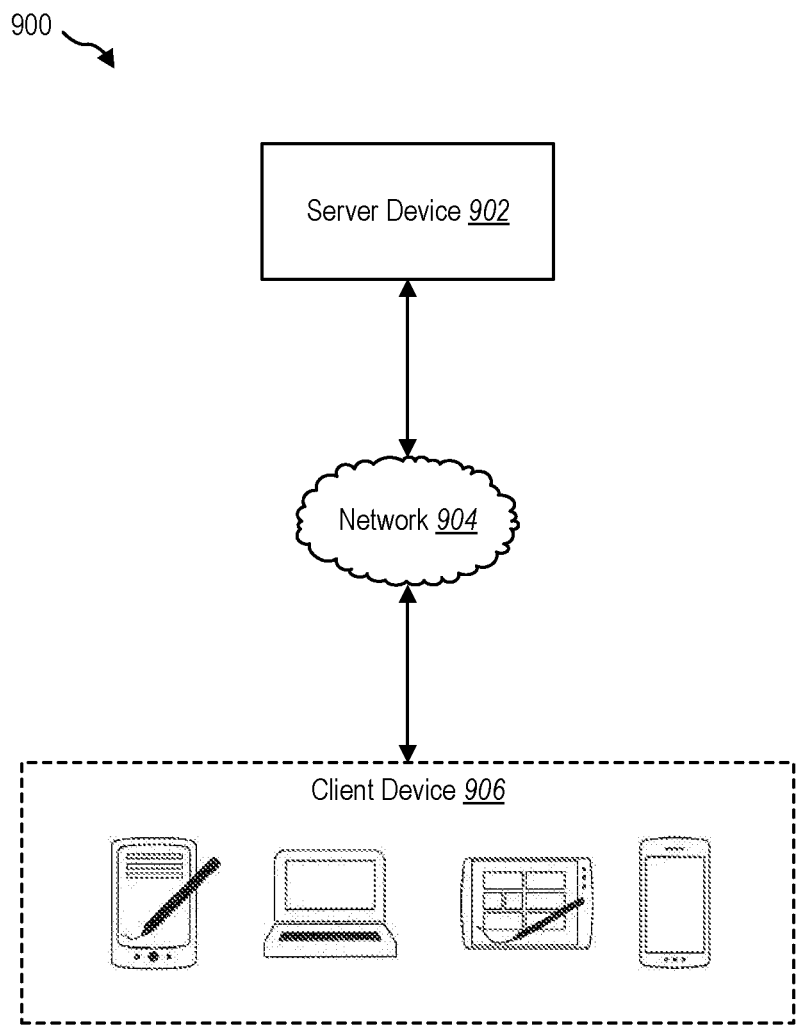
FIG. 9 illustrates a networking environment including a configuration management system in accordance with one or more embodiments.

FIG. 9 illustrates an example network environment 900 in accordance with one or more embodiments described herein. Network environment 900 includes a client device 906 and a server device 902 connected to each other by a network 904. Although FIG. 9 illustrates a particular arrangement of client device 906, server device 902, and network 904, this disclosure contemplates any suitable arrangement of client device 906, server device 902, and network 904. As an example and not by way of limitation, two or more of client devices 906 and server device 902 may be connected to each other directly, bypassing network 904. As another example, two or more of client device 906 and server device 902 may be physically or logically co-located with each other in whole or in part. Moreover, although FIG. 9 illustrates a particular number of client devices 906, server device(s) 902, and networks 904, this disclosure contemplates any suitable number of client devices 906, server device(s) 902, and networks 904. As an example and not by way of limitation, network environment 900 may include multiple client devices 906, server device(s) 902, and networks 904.

This disclosure contemplates any suitable network 904. As an example and not by way of limitation, one or more portions of network 904 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 904 may include one or more networks 904.

Links may connect client device 906 and server device 902 to communication network 904 or to each other. This disclosure contemplates any suitable links. In particular embodiments, one or more links include one or more wireline (such as, for example, Digital Subscriber Line (DSL) or Data Over Cable Service Interface Specification (DOCSIS)), wireless (such as, for example, Wi-Fi or Worldwide Interoperability for Microwave Access (WiMAX)), or optical (such as, for example, Synchronous Optical Network (SONET) or Synchronous Digital Hierarchy (SDH)) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 900. One or more first links may differ in one or more respects from one or more second links.

In particular embodiments, client device 906 may be an electronic device including hardware, software, or embedded logic components or a combination of two or more such components and capable of carrying out the appropriate functionalities implemented or supported by client device 906. As an example and not by way of limitation, a client device 906 may include any of the computing devices discussed above in relation to one or more embodiments described herein. A client device 906 may enable a network user at client device 906 to access network 904. A client device 906 may enable its user to communicate with other users at other client systems.

In particular embodiments, client device 906 may include a web browser, such as MICROSOFT INTERNET EXPLORER, GOOGLE CHROME, or MOZILLA FIREFOX, and may have one or more add-ons, plug-ins, or other extensions, such as TOOLBAR or YAHOO TOOLBAR. A user at client device 906 may enter a Uniform Resource Locator (URL) or other address directing the web browser to a particular server (such as a server, or a server associated with a third-party system), and the web browser may generate a Hyper Text Transfer Protocol (HTTP) request and communicate the HTTP request to the server. The server may accept the HTTP request and communicate to client device 906 one or more Hyper Text Markup Language (HTML) files responsive to the HTTP request. Client device 906 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example, and without limitation, those written in JAVASCRIPT, JAVA, MICROSOFT SILVERLIGHT, combinations of markup languages and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, server device 902 may include a variety of servers, sub-systems, programs, modules, logs, and data stores. In particular embodiments, server device 902 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Server device 902 may also include suitable components such as network interfaces, security mechanisms, load balancers, failover servers, management-and-network-operations consoles, other suitable components, or any suitable combination thereof.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with fewer or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A system comprising:
   at least one processor; and
   a computer-readable medium storing instructions thereon that, when executed by the at least one processor, cause a computing device to:
   maintain a plurality of security policies, the plurality of security policies including:
   a plurality of configuration states associated with configuration settings of a client device, the configuration settings referring to one or more settings of an application or operating system on the client device that grant or restrict access to one or more intended functionalities of the application or operating system; and mapping information associating the plurality of security policies to a plurality of security standards;

receive a request to enforce a first security standard from the plurality of security standards;

identify a first subset of security policies from the plurality of security policies having mapping information associated with the first security standard for enforcement on the client device, wherein enforcing the first security standard includes causing the client device to perform an operation to enforce a configuration state for a corresponding configuration setting defined by a security policy from the identified subset of security policies regardless of a current state of the configuration setting prior to receiving the request to implement the plurality of security policies on the client device;

determine whether an exemption applies to at least one of the first subset of security policies;

in response to determining that the exemption applies to the at least one of the first subset of security policies, bypass enforcement of the at least one of the first subset of security policies; and identify a second subset of security policies from the plurality of security policies having mapping information associated with a second security standard for enforcement on the client device.

2. The system of claim 1, wherein the operation to enforce the configuration state includes an idempotent operation in which a check and a fix of the security policy are the same operation.

3. The system of claim 1, wherein the instructions cause the computing device to:

receive a report including information associated with enforcing at least one of the first or second subset of security policies on the client device; and generate a compliance report indicating a measure of compliance with at least one of the first or second security standard.

4. The system of claim 3, wherein generating the compliance report further includes:

based on overlap between mapping information for the first subset of security policies and the mapping information associated with the second security standard, providing, within the compliance report, an indication of a second measure of compliance with the second security standard.

5. The system of claim 1, wherein the instructions cause the computing device to provide an option to request enforcement of the second security standard.

6. The system of claim 1, wherein enforcing the second security standard includes causing the client device to perform one or more operations to enforce one or more configuration states for one or more corresponding configuration settings defined by the second subset of security policies.

7. The system of claim 1, wherein the plurality of security standards includes two or more of Center for Internet Security (CIS) standards, Standard Technical Implementation Guide (STIG) standards, Payment Card Industry (PCI) standards, and Health Insurance Portability and Accountability Act (HIPAA) standards, and wherein the instructions further cause the computing device to:

generate the mapping information for the plurality of security policies by mapping the plurality of configuration states associated with configuration settings of the client device to respective security standards from the plurality of security standards.

8. A computer-implemented method comprising:

maintaining a plurality of security policies, the plurality of security policies including:

a plurality of configuration states associated with configuration settings of a client device, the configuration settings referring to one or more settings of an application or operating system on the client device that grant or restrict access to one or more intended functionalities of the application or operating system; and mapping information associating the plurality of security policies to a plurality of security standards;

receiving a request to enforce a first security standard from the plurality of security standards;

identifying a first subset of security policies from the plurality of security policies having mapping information associated with the first security standard for enforcement on the client device, wherein enforcing the first security standard includes causing the client device to perform an operation to enforce a configuration state for a corresponding configuration setting defined by a security policy from the identified subset of security policies regardless of a current state of the configuration setting prior to receiving the request to implement the plurality of security policies on the client device;

determining whether an exemption applies to at least one of the first subset of security policies;

in response to determining that the exemption applies to the at least one of the first subset of security policies, bypassing enforcement of the at least one of the first subset of security policies; and identifying a second subset of security policies from the plurality of security policies having mapping information associated with a second security standard for enforcement on the client device.

9. The computer-implemented method of claim 8, further including:

receiving a report including information associated with enforcing at least one of the first or second subset of security policies on the client device; and generating a compliance report indicating a measure of compliance with at least one of the first or second security standard.

10. The computer-implemented method of claim 9, wherein generating the compliance report further includes:

based on overlap between mapping information for the first subset of security policies and the mapping information associated with the second security standard, providing, within the compliance report, an indication of a second measure of compliance with the second security standard.

11. The computer-implemented method of claim 8, wherein enforcing the second security standard includes causing the client device to perform one or more operations to enforce one or more configuration states for one or more corresponding configuration settings defined by the second subset of security policies.

12. A non-transitory computer-readable medium storing instructions thereon that, when executed by at least one processor, cause a computing device to:

maintain a plurality of security policies, the plurality of security policies including:

a plurality of configuration states associated with configuration settings of a client device, the configuration settings referring to one or more settings of an application or operating system on the client device that grant or restrict access to one or more intended functionalities of the application or operating system; and mapping information associating the plurality of security policies to a plurality of security standards;

receive a request to enforce a first security standard from the plurality of security standards;

identify a first subset of security policies from the plurality of security policies having mapping information associated with the first security standard for enforcement on the client device, wherein enforcing the first security standard includes causing the client device to perform an operation to enforce a configuration state for a corresponding configuration setting defined by a security policy from the identified subset of security policies regardless of a current state of the configuration setting prior to receiving the request to implement the plurality of security policies on the client device;

determine whether an exemption applies to at least one of the first subset of security policies;

in response to determining that the exemption applies to the at least one of the first subset of security policies, bypass enforcement of the at least one of the first subset of security policies; and identify a second subset of security policies from the plurality of security policies having mapping information associated with a second security standard for enforcement on the client device.

13. The non-transitory computer-readable medium of claim 12, further including instructions that, when executed by the at least one processor, cause the computing device to:

receive a report including information associated with enforcing at least one of the first or second subset of security policies on the client device; and generate a compliance report indicating a measure of compliance with at least one of the first or second security standard.

14. The non-transitory computer-readable medium of claim 13, wherein generating the compliance report further includes:

based on overlap between mapping information for the first subset of security policies and the mapping information associated with the second security standard, providing, within the compliance report, an indication of a second measure of compliance with the second security standard.

15. The non-transitory computer-readable medium of claim 12, wherein enforcing the second security standard includes causing the client device to perform one or more operations to enforce one or more configuration states for one or more corresponding configuration settings defined by the second subset of security policies.

* * * * *